Feb. 28, 1933.     O. B. McCLINTOCK     1,899,735
BULLET RESISTING STRUCTURE
Filed Jan. 22, 1932     5 Sheets-Sheet 1
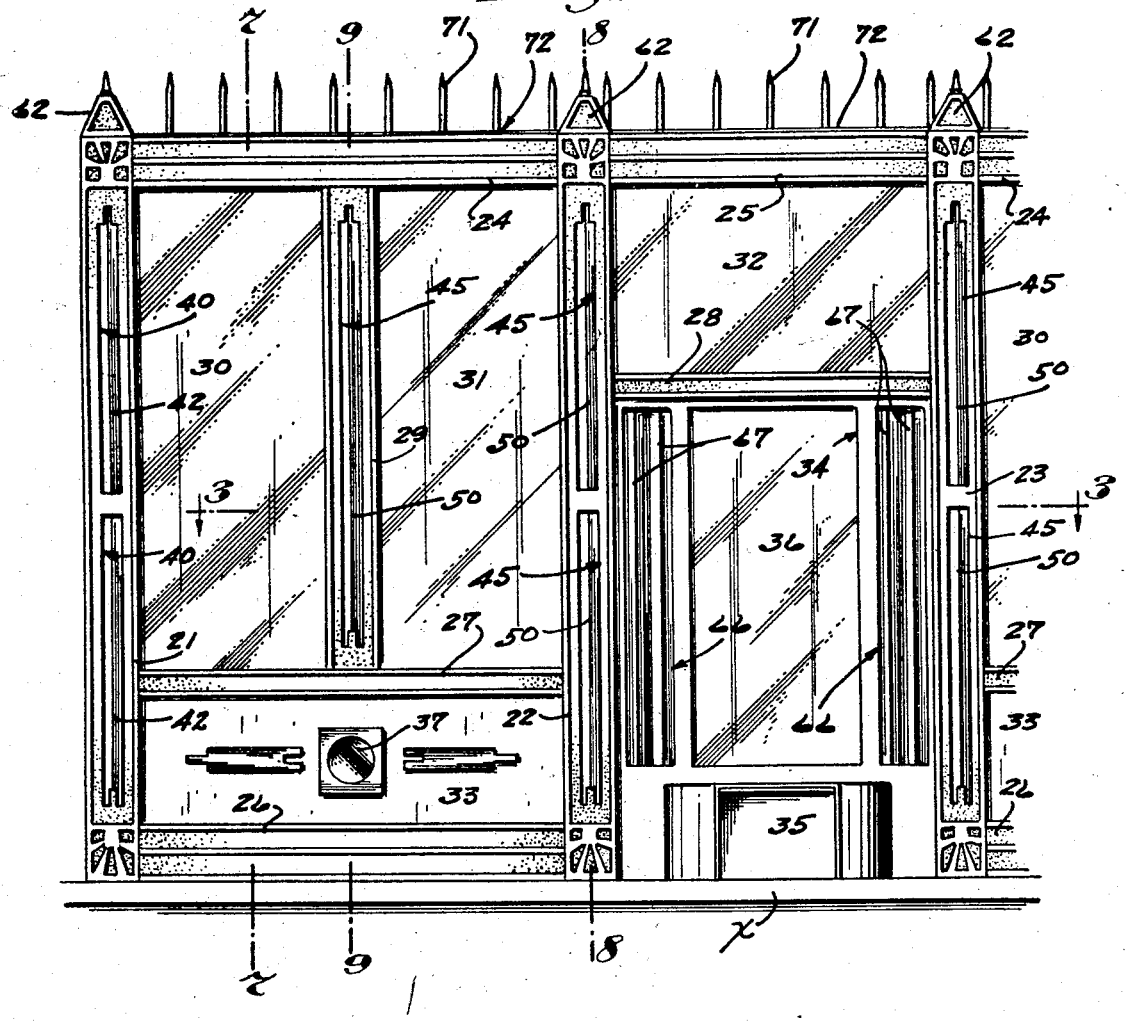
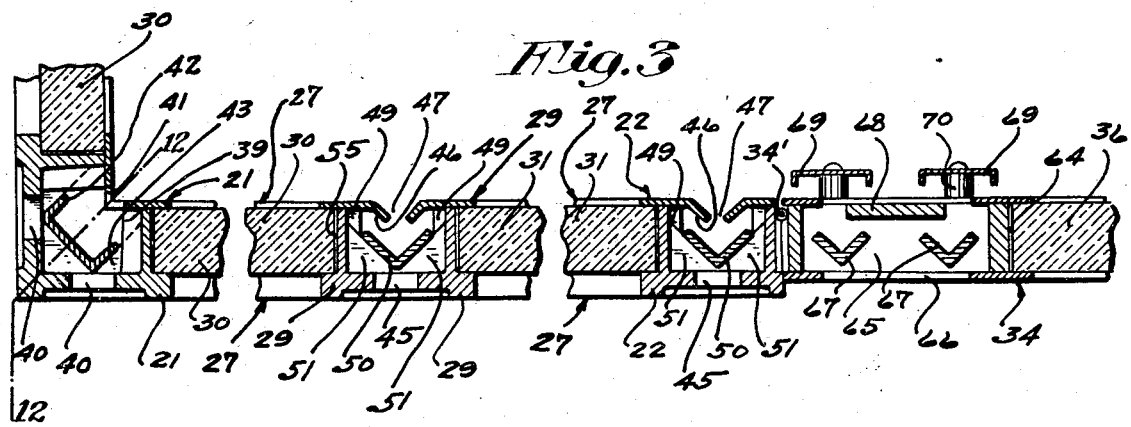
INVENTOR
O. B. McClintock
BY HIS ATTORNEYS Feb. 28, 1933. O. B. McCLINTOCK 1,899,735
BULLET RESISTING STRUCTURE
Filed Jan. 22, 1932 5 Sheets-Sheet 2

INVENTOR
O. B. McClintock
BY HIS ATTORNEYS

Feb. 28, 1933. O. B. McCLINTOCK 1,899,735
BULLET RESISTING STRUCTURE
Filed Jan. 22, 1932  5 Sheets-Sheet 3
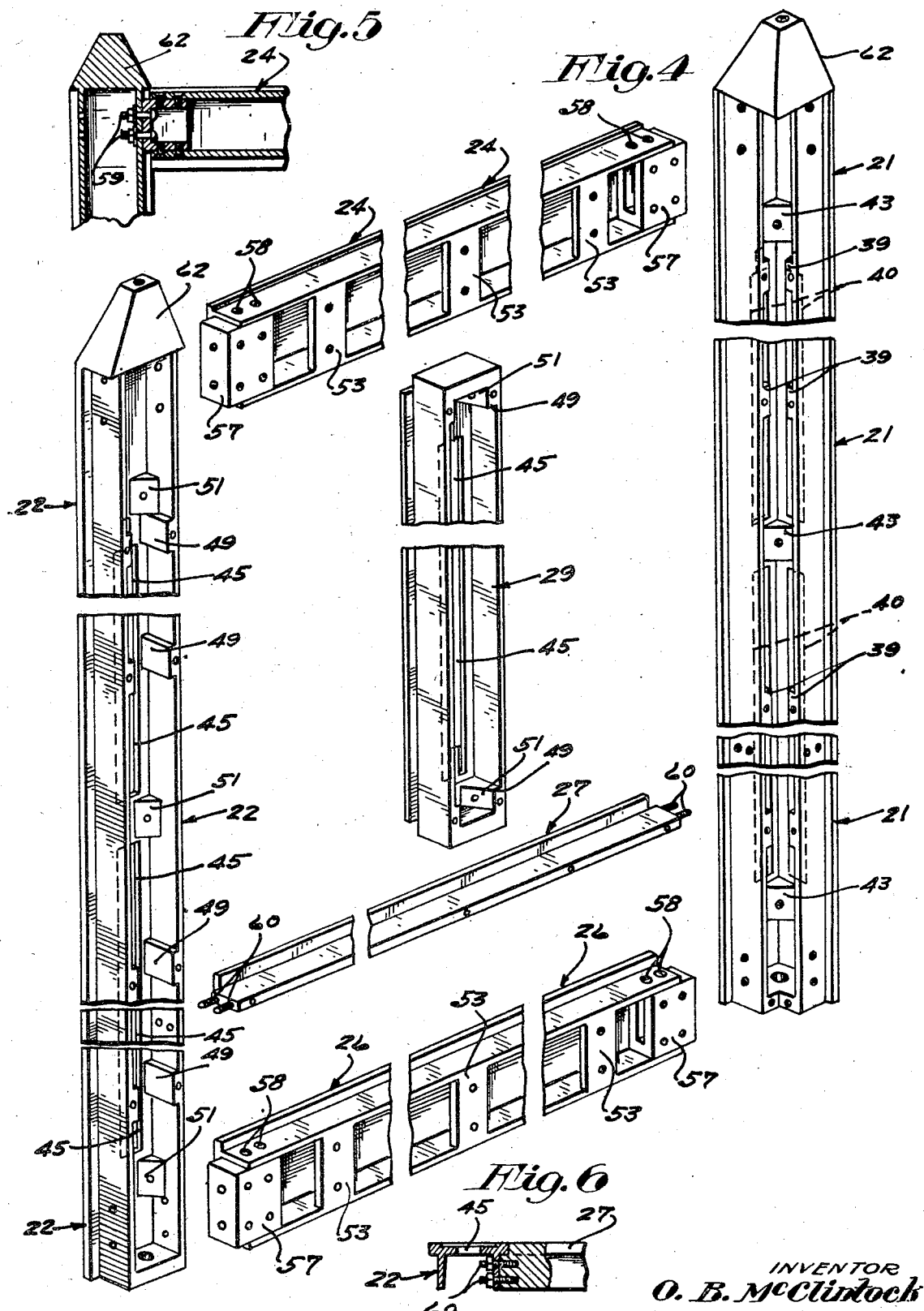

Feb. 28, 1933. O. B. McCLINTOCK 1,899,735
BULLET RESISTING STRUCTURE
Filed Jan. 22, 1932 5 Sheets-Sheet 4
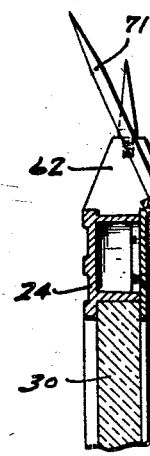
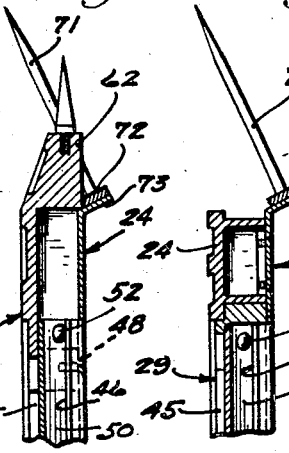
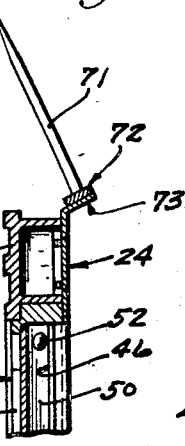
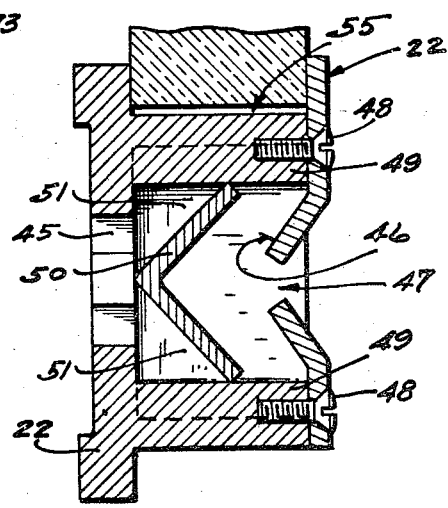
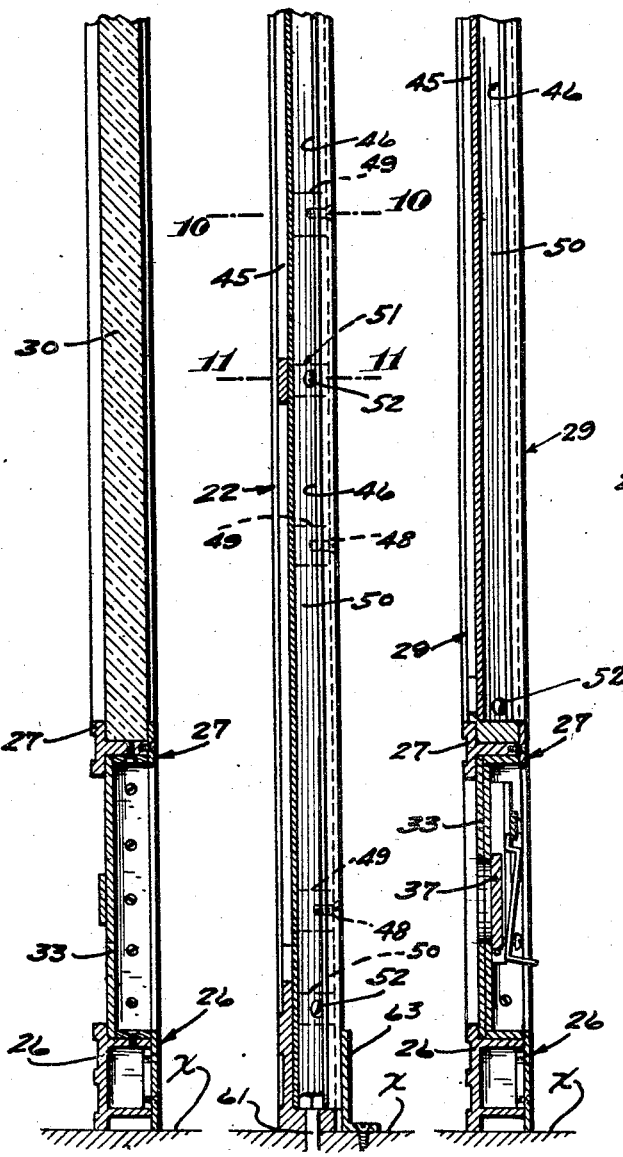
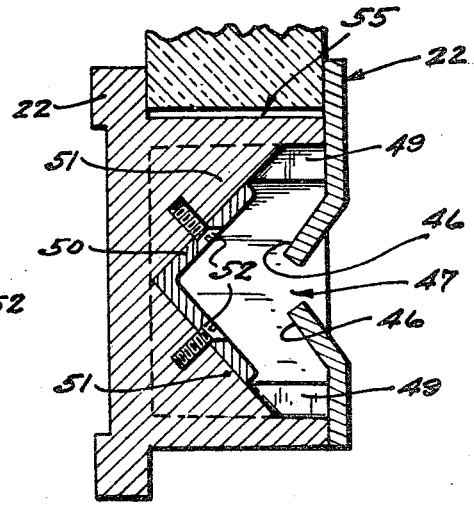
INVENTOR
O. B. McClintock
BY HIS ATTORNEYS

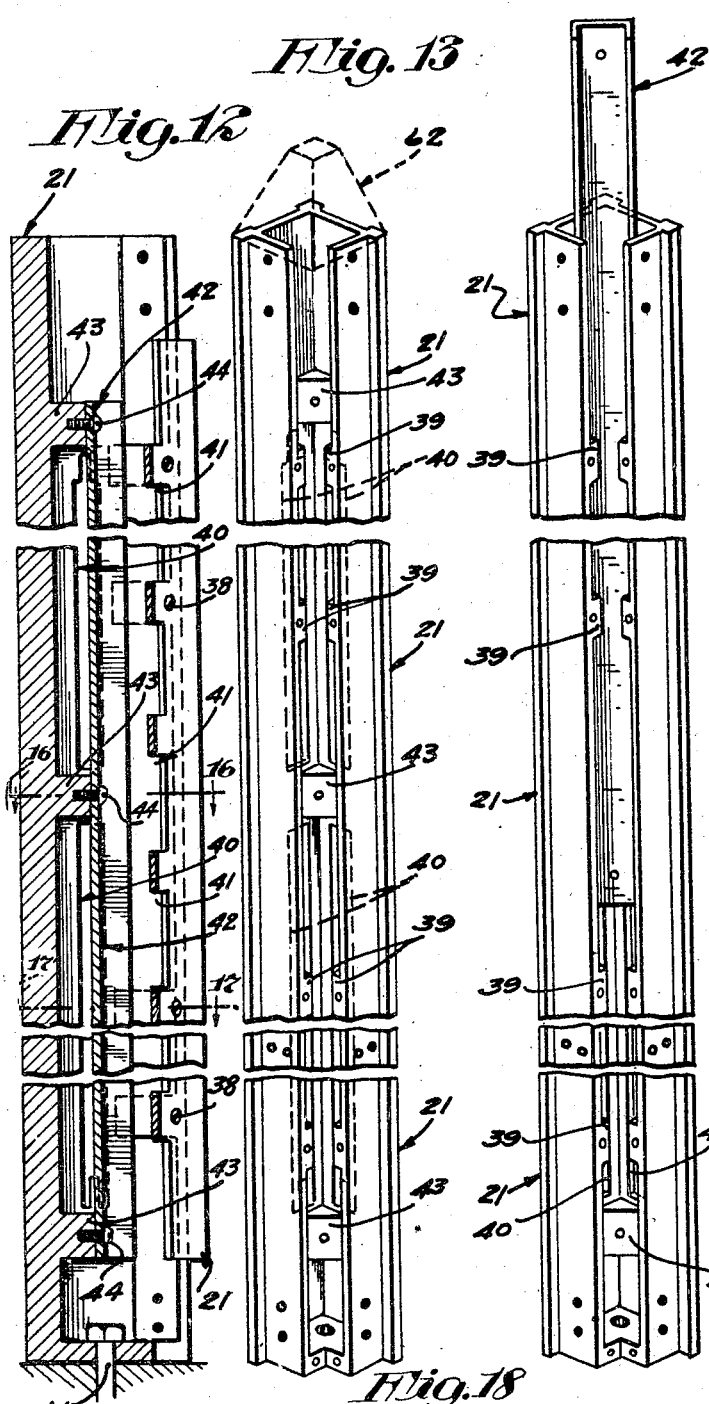

Patented Feb. 28, 1933

1,899,735

UNITED STATES PATENT OFFICE

OLIVER B. McCLINTOCK, OF MINNEAPOLIS, MINNESOTA, ASSIGNOR TO O. B. McCLINTOCK COMPANY, OF MINNEAPOLIS, MINNESOTA, A CORPORATION OF MINNESOTA

BULLET-RESISTING STRUCTURE

Application filed January 22, 1932. Serial No. 588,089.

My present invention has for its object the provision of a highly efficient bullet-resisting structure for the exposed side or sides of a teller's cage or similar enclosure to protect the person or persons in the enclosure as well as the valuables in his possession from a daylight holdup bandit.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary front elevation of the bullet-resisting structure;

Fig. 3 is a horizontal section taken on the line 3—3 of Fig. 1 with additional parts broken away, on an enlarged scale;

Fig. 4 is a fragmentary perspective rear view of the structural members of the assembly shown in Fig. 1 segregated, on an enlarged scale;

Fig. 5 is a fragmentary detail view in section showing one of the posts and top rail connections;

Fig. 6 is a fragmentary detail view in section showing one of the posts and intermediate cross rail connections;

Figure 2:
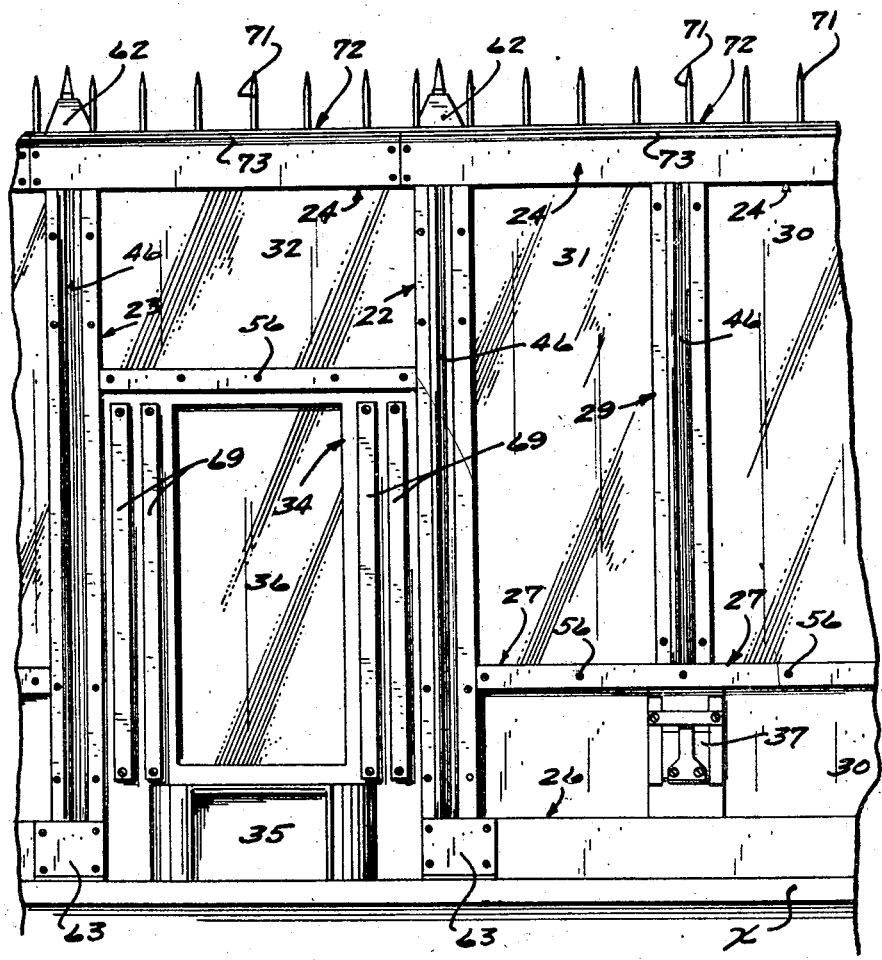
Fig. 2 is a rear elevation of the parts shown in Fig. 1.
Figure 19:
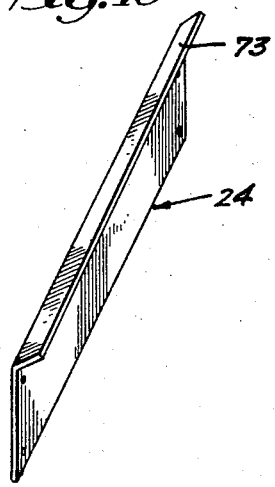
Figure 20:
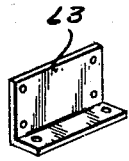

Figs. 7, 8 and 9 are fragmentary views in section taken on the lines 7—7, 8—8 and 9—9 of Fig. 1, on an enlarged scale;

Figs. 10 and 11 are fragmentary detail views in section taken on the lines 10—10 and 11—11 of Fig. 8, on an enlarged scale;

Fig. 12 is a fragmentary view in section taken on the line 12—12 of Fig. 3;

Fig. 13 is a fragmentary perspective rear view of the corner post with the cap shown by means of broken lines;

Fig. 14 is a view corresponding to Fig. 13 but further showing the baffle partly inserted into the post;

Fig. 15 is a fragmentary perspective view of the baffle removed from the post;

Figs. 16 and 17 are horizontal sections taken on the lines 16—16 and 17—17 of Fig. 12;

Fig. 18 is a fragmentary view in section showing a modification of the corner post;

Fig. 19 is a perspective view of one of the back members for the top rail removed; and Fig. 20 is a perspective view of one of the closure plates removed from the structure.

The bullet-resisting structure illustrated may be assumed to be part of an enclosure in a banking or customers' room for tellers or other persons handling money and other valuables. This structure is mounted on a counter X which may be part of the banking fixtures or of special design and construction and for the purpose of this case it is only necessary to state that this counter will be lined or otherwise reinforced with bullet-resisting material. If the counter is of special design the same may be made of bullet-resisting material.

The improved bullet-resisting structure, as illustrated, is one unit of an enclosure which may be duplicated any number of times to form a complete structure and the frame thereof, as illustrated, consists of a corner post 21, two intermediate posts 22 and 23, two top rails 24 and 25, a base rail 26, two intermediate cross-tie rails 27 and 28, and a mullion 29. The rails 24, 26 and 27 connect the two posts 21 and 22, the rails 25 and 28 connect the posts 22 and 23 and the mullion 29 connects the rails 24 and 27. The opening between the post 21, the mullion 29 and the rails 24 and 27 is closed by a panel 30, the opening between the post 22, the mullion 29 and the rails 24 and 27 is closed by a panel 31 and the opening between the posts 22 and 23 and the rails 25 and 28 is closed by a panel 32. Each of these panels 30, 31 and 32 is formed from a single piece of bullet-resisting glass. A metallic panel 33 closes the opening between the posts 21 and 22 and the rails 26 and 27.

The opening between the posts 22 and 23 and the counter X and the rail 28 is normally closed by a bullet-resisting wicket 34 hinged at 34' to the post 22 for inward swinging movement over said counter. Any suitable means, not shown, will be provided for locking the wicket closed from the inside of the structure. Mounted in the bottom of the wicket 34 for bodily movement therewith is a deal tray 35 disclosed and broadly claimed in the application for United States Letters Patent filed May 16, 1931 by Edward C. Hanson and Sylvan R. Popp under Serial Number 537,770 and assigned to the O. B. McClintock Company. This wicket 34, above the deal tray 35, is provided with a bullet-resisting glass panel 36 and on each of said panels is a voice or sound panel, as will presently appear.

A normally closed gun port 37 is formed in the panel 33 at the center thereof and directly below the mullion 29 and which port is disclosed and broadly claimed in an application for United States Letters Patent filed January 15, 1932 by Sylvan R. Popp under Serial Number 586,916.

The posts 21, 22, 23, the rails 24, 25 and 26, and the mullion 29 are hollow structures and the face and side members thereof are each in the form of a single aluminum or metallic casting and the back members thereof are formed from bullet-resisting sheet metal. The face members of the post 21, as well as the back members thereof, are at right angles to each other and said back members are detachably secured to the side members by screws 38, which have threaded engagement with lugs 39 formed with the side members of said post at the inner faces thereof. Voice openings 40 are formed in each face member of the post 21 and similar openings 41 are formed in the back members thereof at the connecting angle therebetween.

Within the post 21 is a baffle 42, which forms a tortuous passage therethrough and cuts off direct vision through the voice openings 40 and 41 so that a bullet can not be fired therethrough but at the same time this baffle 42 does not interfere with the passage of sounds through the post 21. The baffle 42, as shown, is an upright channel bar that is inserted endwise into the post 21 through the top thereof, see Fig. 14, with its flanges turned toward the back of said post. If desirable two angle bars could be used in place of the channel bar. Front and side filler blocks 43, integral with the post 21 in the three front corners thereof, and the lugs 39 self-center the baffle 42 in said post with its corners at the transverse centers of the voice openings 40 and with its web and flanges at right angles to the face members of the post 21 thus providing V-shaped deflecting surfaces just back of each voice opening 40. These filler blocks 43 and the lugs 39 positively hold the baffle 42 in the post 21 against horizontal movement in all directions and screws 44 detachably connect the baffle 42 to the front filler blocks 43.

In the face members of the posts 22 and 23 and the mullion 29 are voice or sound openings 45 and the back members thereof which, as previously stated, are of bullet-resisting sheet metal. Each back member of the posts 22 and 23 and the mullion 29 comprises two upright sections, the opposing edge portions of which are turned inwardly substantially 90° to form forwardly converging deflecting surfaces 46 and which sections are edgewise spaced to leave sound or voice openings 47 therebetween. These back member sections of the posts 22 and 23 and the mullion 29 are detachably secured to the side members thereof by screws 48, which have threaded engagement with lugs 49 integral with said side members on the inner surfaces thereof.

Within each post 22 and 23 and the mullion 29 is a baffle 50 in the form of an upright angle bar positioned by filler blocks 51. The front corners of the baffles 50 are at the transverse centers of the voice openings 45 and their flanges extend 90° to the face members of the posts 22 and 23 and the mullion 29 and afford V-shaped deflecting surfaces back of the voice openings 45. The filler blocks 51 are in the front corners of the posts 22 and 23 and the mullion 29 and integral therewith and the baffles 50 are detachably secured to said filler blocks by screws 52. These baffles 50, as will be noted in Fig. 3, form tortuous passages through the posts 22 and 23 and the mullion 29 and cut off direct vision through the voice openings 45 and 47 so that a bullet can not be fired through said posts but at the same time the baffles 50 do not interfere with the passage of sounds through said posts.

The side members of each top rail 24 and 25 and the base rail 26 are connected at their outer edge portions by a plurality of cross-tie members 53, which are integral therewith, see Fig. 4, and the back members of said rails are detachably secured to said rails by screws which have threaded engagement with the cross-tie members 53. It is important to note that the side members of the posts 21, 22, and 23, mullion 29, and the rails 24, 25 and 26 are inset to form sections of channels 55 in which the panels 30, 31, 32 and 33 are mounted.

Each intermediate rail 27 and 28 includes a face member, a body member and a back member. The rail 27 is I-shaped in cross-section and the rail 28 is channel-shaped in cross-section and form sections of the channels 55 which are continuous for each panel 30, 31, 32 and 33. The back members of the rails 27 and 28 are detachably secured by screws 56 to the body members thereof.

Fitted in the open ends of the rails 24, 25 and 26 are hollow blocks 57, which are rigidly secured to the side members of said rails by upper and lower pairs of screws 58. The blocks 57 project outward of the rails 24, 25 and 26 into the channels 55 and are rigidly but detachably secured to the posts 21, 22 and 23 by pairs of nut-equipped bolts 59. These bolts 59 extend through aligned holes in the outer ends of the blocks 57 and the adjacent sides of the posts 21, 22 and 23. By reference to Fig. 5, it will be noted that the inner ends of the blocks 57 are open to permit the application of the bolts 59.

The rails 27 and 28 are rigidly but detachably secured to the posts 21, 22 and 23 by pairs of nut-equipped screwstuds 60 anchored in the ends of the body members of said rails and project into said posts through holes in the adjacent side members thereof, see Fig. 6. The end portions of the bodies of the rails 27 and 28 extend into the channels 55 in the posts 21, 22 and 23 which, together with the blocks 57 that also project into said channels, securely hold the posts and rails interlocked and form a rigid structure that can be very quickly set up or taken down. The bottoms of the posts 21, 22 and 23 are closed by parts of the same castings and said posts are secured to the counter X on which they rest, by bolts 61, that extend through holes in said bottoms.

The tops of the posts 21, 22 and 23 are closed by caps 62, which are formed by parts of the same castings except the cap for the corner post 21, which is cast separate to permit the insertion of the baffle 42 into said post and thereafter rigidly secured in place by welding.

It is important to note that the side members of the mullion 29 loosely extend into the channels 55, see Figs. 4 and 9, and thereby interlock said mullion with the rails 24 and 27 against removal therefrom but with freedom for bodily shifting movement longitudinally of said rails and in the plane thereof. The purpose of thus mounting the mullion 29 is to permit the same to be adjusted in the channels 55, during assembly of the bullet-resisting structure, to compensate for varying widths in the two panels 30 and 31. The interlocking of the rails 24, 25 and 26 with the posts 21, 22 and 23 by the projection of the blocks 57 into the channel 55 and also the interlocking of the rails 27 and 28 with said posts by the projection of their body members into said channels as well as the interlocking of the mullion 29 with the rails 24 and 27, as previously stated, hold the posts, mullion and rails in predetermined relation to each other so that they are all properly aligned and rigidly held.

The exposed surfaces of the post, rails and mullion are cast and finished in such a manner as to give the structure an artistic appearance and the voice openings 40 and 45 back of which are the baffles 42 and 50 also lend themselves to the artistic appearance of the structure.

Angle plates 63 are provided for closing the openings in the backs of the posts 21, 22 and 23 between the back members of said posts. These plates 63 are of the same material as the back members of the posts and rails and are secured by screws to said posts, back members of the base rail and the counter X.

The wicket 34 includes a skeleton frame of substantially the same depth as the side members of the posts 21, 22 and 23, a face plate rigidly secured to said frame, and a back plate detachably secured to said frame. A continuous channel 64 is formed by the wicket frame and the face and back plates of the wicket 34 for the marginal edge portions of the glass panel 36 which are mounted therein.

Formed in the frame of the wicket 34 on each side of the panel 36 is a compartment 65 that is completely closed except for voice openings 66 in the face and back members of said wicket. Tortuous passages are formed through the compartment 65 by a baffle comprising a pair of front angle bars 67, a single flat bar 68 and a pair of rear channel bars 69. These bars are all upright and the bars 67 and 68 are within the compartment 65, extend the full height thereof and the bars 69 are rearward of the wicket 34 and rigidly secured thereto both above and below the rear voice opening 66.

The bars 67 are in the form of angles spaced from each other and the side of the compartment 65 and positioned with their corners just back of the face member of the wicket 34 and with their flanges turned 90° thereto, which afford deflecting surfaces. The single bar 68 is just forward of the back member of the wicket 34, directly back of the opening between the bars 67 and is relatively wide so that it overlaps the two inner flanges of the bar 67. The flanges of the bars 69 are turned toward the wicket 34 and held therefrom by spacers 70, which form parts of the connections that secure said bars to the back member of the wicket 34. These bars 69 are edgewise spaced and located directly back of the openings between the back member of the wicket 34 and the bar 68 and are of such width as to materially overlap the vertical edge portions of said back member and the vertical edge portions of the bar 68. This staggered arrangement of the bars 67, 68 and 69 form the tortuous passage in the compartment 65 heretofore referred to and cut off direct vision through the voice openings 66 so that a bullet can not be fired therethrough but at the same time the spacing of the members of the baffle is such as to not interfere with the passage of sounds through the wicket 34.

To prevent a bandit from vaulting the structure, there is provided a barrier on the top thereof which, as shown, comprises a multiplicity of laterally spaced upright spikes 71, which are forwardly inclined and pointed. These spikes 71 are rigidly secured to a spike rail 72 which is, in turn, rigidly secured to an upwardly and rearwardly inclined flange 73 formed by extending the upper edge portions of the back members of the top rails 24 and 25 upwardly and rearwardly, see Figs. 7 and 8.

The voice openings in the wicket 34 on each side of the glass panel 36 permit two persons on opposite sides of the wicket to talk to one another in ordinary tones. The voice openings in the posts and mullion also permit persons on opposite sides of the structure to converse without difficulty at different places about the structure.

The post 74 shown in the modification in Fig. 18 is for an angle in the bullet-resisting structure that is less than a right angle. This post 74 is hollow and includes a voice opening 75 in each face member, a voice opening 76 in each back member and a baffle 77 similar to the baffle 50. The glass panels are indicated by the numeral 78.

From the above description it is evident that a teller or other person working in the compartment formed by the bullet-resisting structure is fully protected, as well as the valuables in his possession, from a daylight hold-up bandit. All openings through the structure are made indirect by the baffles so that a bandit can not shoot therethrough but at the same time a person in the cage can shoot through any one of the gun ports, thus giving him a decided advantage over the bandit.

The deal tray 35 permits money, papers and articles to be passed from one side of the wicket 34 to the other and at no time is there a direct opening through said tray. The bullet-resisting glass panels in the structure give a person working back of said structure a clear view of the room outside of the enclosure and the voice openings admit all sounds that take place in the room.

What I claim is:

1. A structure of the class described having a post provided with a sound opening and a baffle that is laterally spaced and offset with respect to said post and sound opening to form a tortuous passage and cut off straight line vision through the sight opening in the post.

2. A structure of the class described having a hollow post provided with a sound opening in its face member and a sound opening in its back member, and a baffle in the post arranged to form a tortuous passage and cut off straight line vision through the sound openings.

3. The structure defined in claim 2 in which the back member of the post is displaceable.

4. The structure defined in claim 2 in which the baffle has deflecting surfaces each of which extends at an angle to the face member of the post.

5. The structure defined in claim 2 in which the baffle is V-shaped in cross-section with its apex substantially at the transverse center of the sound opening in the face member and with its flanges diverging from the plane of the front member of the post and spaced from the sides of said post.

6. The structure defined in claim 2 in which the post is provided with filler blocks that position the baffle in the post.

7. The structure defined in claim 2 in which the baffle is an upright bar that is V-shaped in cross-section and positioned in the post with its apex substantially at the center of the sound opening in the face member and with its flanges diverging from the plane of said member and spaced from the side members of the post.

8. The structure defined in claim 2 in which the baffle is an upright bar that is V-shaped in cross-section and positioned in the post with its apex substantially at the center of the sound opening in the face member and with its flanges diverging from the plane of said member and spaced from the side members of the post, said structure further including filler blocks in the front corners of the post and having rearwardly diverging surfaces with which the flanges of the baffle engage to position the baffle.

9. The structure defined in claim 2 in which the baffle is an upright bar that is V-shaped in cross-section and positioned in the post with its apex substantially at the center of the sound opening in the face member and with its flanges diverging from the plane of said member and spaced from the side members of the post, said structure further including filler blocks in the front corners of the post and having rearwardly diverging surfaces with which the flanges of the baffle engage to position the baffle, and fastening means detachably securing the baffle to certain of the filler blocks.

10. The structure defined in claim 2 in which the back member is provided with deflecting surfaces that overlap the baffle.

11. The structure defined in claim 2 in which the back member comprises two upright sections, the adjacent edge portions of which are in inwardly converging relation and afford deflecting flanges and edgewise spaced to form the sound opening in said back member.

12. A structure of the class described having a hollow post provided with a sound opening in its face member and a sound opening in its back member, and an upright baffle bar in the post, said post having seat-forming elements that self-center the baffle in the post with respect to the sound openings.

13. A structure of the class described having a hollow post provided with a sound opening in its face member and a sound opening in its back member, and an upright baffle bar in the post, said post having seat-forming elements arranged to receive the baffle by an endwise movement into the post through the top thereof and self-center the same with respect to the sound openings.

14. The structure defined in claim 13 which further includes a cap for the post that is primarily displaceable to permit the insertion of the baffle into the post.

15. A structure of the class described having a hollow post provided with a sound opening in its face member, the back member of the post being displaceable and having a sound opening, the side members of the post being inset from the outer vertical edges of the face and back member of the post to form channeled seats for panels that are removably held therein by the displaceable back member.

16. A structure of the class described having a pair of laterally spaced hollow posts and upper and lower hollow rails connecting the posts, the opposing side members of the posts and rails being inset to form channeled panel seats, the back members of the posts and rails being displaceable to permit the removal of a panel mounted in said seats, hollow blocks fitted in the ends of the rails, projecting outward thereof and into the channeled seats in the posts, the inner ends of the blocks being open and bolts extending through aligned holes in the outer ends of the blocks and the adjacent sides of the posts and rigidly connecting the blocks to the posts.

In testimony whereof I affix my signature.

OLIVER B. McCLINTOCK.